3,218,191
PROCESS FOR PAINTING A FIBROUS SURFACE
George Domanski, Hudson, Ohio, assignor to The Glidden Company, Cleveland, Ohio, a corporation of Ohio
Filed Oct. 24, 1961, Ser. No. 147,191
5 Claims. (Cl. 117—72)

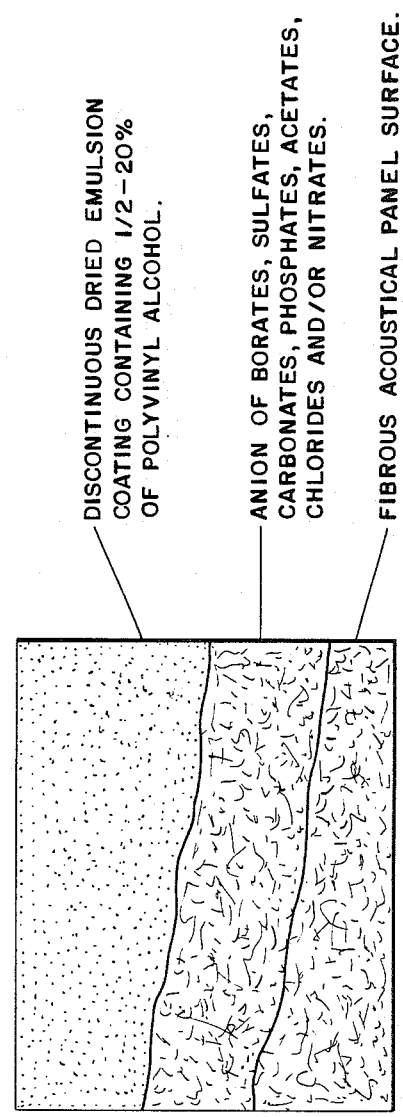

This invention relates to a process for painting a fibrous surface, particularly a textured board-like structure which exposes silicate fibers such as mineral wool, glass fiber, and asbestos, and acoustical panels so coated.

The advantages of my invention over conventional techniques include economical obliteration of the fiber structure and improve holdout of the paint due to a process of coating illustrated in the attached figure of drawins, which figure is a plan view of a fibrous acoustic panel which has been coated in accordance with the invention and has portions of the coating broken away to better illustrate the sequence of coating operations.

My improvement in the painting of a fibrous surface comprises applying an aqueous solution of at least one anion selected from the group consisting of borates, sulfates, carbonates, phosphates, acetates, sulfites, chlorides, and nitrates substantially uniformly to the surface, then applying thereover an aqueous latex emulsion paint containing a minor compatible proportion of polyvinyl alcohol based on the latex solids in the paint.

The anion in the undercoating appears to perform an extremely efficient coagulation of the latex paint subsequently applied. Advantageously, the anion is in the form of an aqueous solution for handling and drying, that is, in the form of a stable acid or salt solution such as a solution of borax, sodium carbonate, acetic acid, sodium sulfate, mono-, di-, or trisodium phosphate, sodium chloride, sodium sulfite, aluminum sulfate, etc. By "phosphates" I mean to include the various acid phosphates, by "carbonates" the bicarbonates and sesquicarbonates, by "sulfates" the bisulfates, by "sulfites" the bisulfites, and by "borates" the tetraborates.

Preferably the anion is in the salt form for convenient uniform application to the fibrous surface. The preferred anion is the tetraborate anion for achieving desired rapid coagulation at the minimum dosage, and borax ($Na_2B_4O_7 \cdot 10H_2O$) is the preferred salt for efficiency in the practice of my invention.

The advantageous solution strength of the borax is 1–3%, preferably 2½%, by weight in water because this can be dispensed readily from conventional spray guns without tending to crystallize out and clog the guns. I have found such borax solution particularly effective for use in my invention when the borax solution is applied to the fibrous structure at the substantially uniform rate of about 5 grams of borax solution per square foot of fibrous surface, although I have used as little as 1.5 grams of borax solution per square foot, and as high as 9 grams of borax solution per square foot with good results. With the other salts or acids it is necessary to use a substantially heavier dosage, e.g., 4–10 times as much to obtain comparable results.

When the anion is applied in the precoating step, it is desirable to dry or at least partially dry the surface before applying the paint coating to obtain the most practical and economic coagulation of the latex paint. Suitably, in a production operation where the object to be coated is being fed into oven for forced drying, I use at least 15 seconds of such drying after the precoating and preferably 30 seconds to a minute before applying the latex paint.

The aqueous latex emulsion paint is a conventional suspension of pigment and film-forming compounded latex dosed with at least about ½ percent of polyvinyl alcohol based on the latex solids of the paint. Thus compounded, the paint coacts with the prior anion deposit to achieve fiber obliteration and holdout at very low application rate (e.g., 20–30 grams of dried paint per square foot with a reflectometer reading, "Y," of over 70% which is desired in the trade). Use of a substantially lower proportion of polyvinyl alcohol slows down this rapid coagulation and is undesirable as the paint loses "holdout." Use of more than a minor proportion of polyvinyl alcohol based on the latex solides in the paint tends to give poor color stability and high water sensitivity to the finish and is, therefore, undesirable. Preferably, for efficiency and economy in the process I use between about ½ percent and about 20% of polyvinyl alcohol based on total latex solids in the paint.

The preferred film-forming latices for efficiency and economy are polyvinyl acetate homopolymer latices, but virtually any film-forming latex which is compatible with polyvinyl alcohol can also be used, e.g., copolymer latices of polyvinyl acetate with vinyl stearate, acrylic latices such as methyl methacrylate, copolymer latices of polyvinyl chloride with vinylidene chloride, neoprene latices, natural latex, and butadiene-styrene latrices. However, the latter two emulsions are distinctly inferior in my process to the poyvinyl acetate-containing latices because of poor color retention, or sensitivity to light, or overbaking in process.

The polyvinyl alcohol that I prefer to use is that commercially readily available, e.g., having percent hydrolysis between 80–100 and viscosity in the range of 4–65 centipoises in 4% water solution at 20° C. However, I can use less highly hydrolyzed grades of polyvinyl alcohol for my purposes, e.g., those over 50% hydrolyzed, and those of a greater or lesser degree of polymerization, e.g., viscosity 2–100 centipoises, provided they can be rendered compatible with the latex emulsion paint.

The prime use of my process is in coating acoustical panels with flat finishes having low gloss readings. The panels can have a surface of vegetable fiber such as paper, macerated bagasse, jute, etc., but usually present a silicate fiber surface that is difficult to coat economically. An advantageous practice in forming the panels is to sand them smooth preparatory to coating, to cover them with a sheet of fiber glass mat or asbestos paper, and then to apply my coating system. The prefrred resulting film is discontinuous so sound absorption is not greatly impaired. If a continuous film is obtained by an especially heavy application of paint, the panel can be perforated subsequent to coating process to obtain sound absorption. The panel is backed in an over, e.g., 300–400° F. for 1.5–3 minutes. When a borax solution is used in the precoating, I have found that the panels resist color degradation from overbaking (being left too long in the oven). The borax-treated boards also have a desirably low flame spread rating.

Unless otherwise indicated all parts are parts by weight and all percentages are weight percentages in this application.

For the following example a white paint was made by mixing together 100 parts of pigmentary anatase titanium dioxide, 400 parts of fine calcium carbonate, 400 parts of fine calcium silicate, 11 parts of tricresyl phosphate, 360 parts of water, 200 parts of an aqueous polyvinyl acetate homopolymer emulsion having viscosity of 900–1300 centipoises, 1–3 micron particle sizes 54% resin solids, pH of 4–6 and weight per gallon of 9.23 lbs. at 25° C., and 50 parts of a 10% solution of polyvinyl alcohol in water, the polyvinyl alcohol being 98½–100% hydrolyzed and exhibiting viscosity between 22–32 centipoises in 4% aqueous solution at 60° F.

In place of the white paint so made colored mineral pigments or conventional organic tinting agents such as phthalocyanine colors could be employed to give a colored paint.

*Example*

A 2½% by weight aqueous solution of borax ($Na_2B_4O_7 \cdot 10H_2O$) was made up and sprayed on a mineral wool acoustical board overlaid with a sheet of textured asbestos paper that exhibited a coarse fibrous structure, the borax solution dosage being 5 grams per square foot. The so-treated board was permitted to flash-evaporate water for about 30 seconds in an oven maintained at 350° F. Then the treated board was sprayed with the white latex paint in a single thin coat and dried for 3 minutes in the oven at 350° F. The dry weight of paint applied was 20–25 grams per square foot of boaad. A discontinuous flat film resulted. It completely obliterated the fiber structure of the board. The sound absorption of the board was not greatly impaired, that is, the board retained about 70% of its original noise-reduction coefficient. Pattern definition on the painted surface was excellent.

I claim:

1. In the painting of a fibrous surface whose fibers are selected from the group consisting of vegetable fibers and silicate fibers, the improvement which consists of (A) applying an aqeuous solution consisting essentially of water and dissolved salt, the latter providing at least one anion selected from the group consisting of borates, sulfacts, carbonates, phosphates, acetates, sulfites, clhorides and nitrates to said fibrous surface in an emulsion-coagulating amount which for the tetraborate anion corresponds to between about 1.5 and 9 grams of 1–3 weight percent aqueous borax solution per square foot of fibrous surface and for all other anions of said group is about 4–10 times greater, and (B) thereafter applying to said surface, with rapid coagulation thereof into a discontinuous film, an aqueous latex emulsion paint having compatibly blended therewith between about 0.5 and 20% by weight of polyvinyl alcohol, based on the latex solids of said paint.

2. The process as claimed in claim 1 and wherein the process includes the step of at least partially drying the applied anion solution before said polyvinyl-alcohol-modified emulsion paint is applied.

3. The process as claimed in claim 2 wherein the applied aqueous salt solution is a 1–3% aqueous solution of borax, by weight.

4. The process as claimed in claim 3 wherein the emulsion paint contains a vinyl acetate polymer latex.

5. The process as claimed in claim 1 wherein the anion is the tetraborate anion of borax.

References Cited by the Examiner
UNITED STATES PATENTS

| | | | |
|---|---|---|---|
| 1,806,589 | 5/1931 | Espig et al. | 117—123 |
| 2,251,296 | 8/1941 | Shipp | 117—161 |
| 2,542,428 | 2/1951 | Peik | 117—70 |
| 2,562,711 | 7/1951 | Gessler et al. | 171—33 XR |
| 2,591,904 | 4/1952 | Zola | 106—170 |
| 2,722,489 | 11/1955 | Hennessey et al. | 117—126 |
| 2,855,327 | 10/1958 | Gilchrist et al. | 117—140 |
| 2,941,899 | 6/1960 | Stalego | 117—72 XR |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,218,191                              November 16, 1965

George Domanski

It is hereby certified that error appears in the above numbered patent requiring correction and that the said Letters Patent should read as corrected below.

Column 1, line 16, for "drawins" read -- drawings --; column 2, line 23, for "latrices" read -- latices --; line 45, for "prefrred" read -- preferred --; line 50, for "backed in an over" read -- baked in an oven --; column 3, line 15, for "boaad" read -- board --; lines 28 and 29, for "sulfacts" read -- sulfates --; line 29, for "clhorides" read -- chlorides --.

Signed and sealed this 6th day of September 1966.

(SEAL)
Attest:

ERNEST W. SWIDER                                   EDWARD J. BRENNER
Attesting Officer                                         Commissioner of Patents